United States Patent Office.

JAMES H. STEBBINS, JR., OF NEW YORK, N. Y.

IMPROVEMENT IN COLORING-MATTERS OBTAINED FROM DIAMIDO-NAPHTHALINE AND DIAZO-NAPHTHALINE NITRATE.

Specification forming part of Letters Patent No. 221,116, dated October 28, 1879; application filed April 23, 1879.

*To all whom it may concern:*

Be it known that I, JAMES H. STEBBINS, Jr., of the city, county, and State of New York, have invented a new and useful Improvement in Coloring-Matters, which improvement is fully set forth in the following specification.

This invention relates to a coloring-matter which I call "naphthaline-brown," and which is obtained by the reaction of diamido-naphthaline on diazo-naphthaline nitrate.

In carrying out my invention I treat naphthaline with fuming nitric acid, and then pour the mass in a large volume of water. After straining off the water dinitro-naphthaline remains, which is dissolved in glacial acetic acid at a gentle heat. On cooling, the alpha derivative of the dinitro-naphthaline crystallizes out. The crystals thus formed are collected on a filter and allowed to dry. By treating these crystals with tin and strong hydrochloric acid the dinitro-naphthaline is reduced to diamido-naphthaline hydrochlorate, which is freed from tin by sulphureted hydrogen. By heating the dinitro-naphthaline hydrochlorate with bicarbonate of soda I obtain the pure base diamido-naphthaline, which I seal up in a tube for further use.

In the meanwhile I treat naphthylamine with dilute nitric acid and warm gently. On cooling, naphthylamine-nitrate is formed. This is purified by repeated recrystallization, and then a portion thereof is dissolved in water, so as to produce a sirup-like mass, through which is passed a stream of nitrous acid till the same becomes as fluid as water, forming diazo-naphthaline nitrate. By dissolving a quantity of the diamido-naphthaline (obtained by the first process) in alcohol, and adding thereto the diazo-naphthaline nitrate, a heavy reddish-brown precipitate is formed, which, however, soon disappears, leaving a red-brown solution behind, which contains my naphthaline-brown. Silk dipped into this solution is dyed of a fine brown color. When the silk is mordanted with acetic acid and then immersed in the above-named solution, a much deeper brown is produced.

If the silk be mordanted with iron chloride an almost black color is obtained. If the silk be mordanted with chloride of tin the color formed is a fine purple.

The naphthaline-brown can be produced in the form of crystals by evaporation.

By evaporating some of the above-named solution on a watch-glass, star-shaped crystals of a dark-red color are formed. These crystals dissolve easily in alcohol and in strong sulphuric acid with a deep blue color. They dissolve slightly in water.

What I claim as new, and desire to secure by Letters Patent, is—

As a new manufacture, the coloring-matter or dye-stuff obtained from the reaction of diamido-naphthaline on diazo-naphthaline nitrate, substantially in the manner set forth, or by any other method which will produce a like result.

In testimony that I claim the foregoing I have hereunto set my hand and seal this 19th day of April, 1879.

JAMES H. STEBBINS, JR. [L. S.]

Witnesses:
W. HAUFF,
E. F. KASTENHUBER.